(12) United States Patent
Hashigami

(10) Patent No.: US 12,434,257 B2
(45) Date of Patent: Oct. 7, 2025

(54) FILM-FORMING ATOMIZER, FILM-FORMING APPARATUS, AND FILM-FORMING METHOD

(71) Applicant: SHIN-ETSU CHEMICAL CO., LTD., Tokyo (JP)

(72) Inventor: Hiroshi Hashigami, Annaka (JP)

(73) Assignee: SHIN-ETSU CHEMICAL CO., LTD., Tokyo (JP)

( * ) Notice: Subject to any disclaimer, the term of this patent is extended or adjusted under 35 U.S.C. 154(b) by 132 days.

(21) Appl. No.: 18/018,746

(22) PCT Filed: Jul. 9, 2021

(86) PCT No.: PCT/JP2021/026035
§ 371 (c)(1),
(2) Date: Jan. 30, 2023

(87) PCT Pub. No.: WO2022/030187
PCT Pub. Date: Feb. 10, 2022

(65) Prior Publication Data
US 2023/0302482 A1 Sep. 28, 2023

(30) Foreign Application Priority Data
Aug. 5, 2020 (JP) .................... 2020-133132

(51) Int. Cl.
*B05B 17/06* (2006.01)
*B05B 7/26* (2006.01)
*B05D 1/02* (2006.01)

(52) U.S. Cl.
CPC .......... *B05B 17/0676* (2013.01); *B05B 7/262* (2013.01); *B05D 1/02* (2013.01)

(58) Field of Classification Search
CPC ..................................................... B05B 17/06
See application file for complete search history.

(56) References Cited

U.S. PATENT DOCUMENTS

| 4,271,100 | A | 6/1981 | Trassy |
| 7,934,703 | B2 | 5/2011 | Tomono et al. |
| (Continued) | | | |

FOREIGN PATENT DOCUMENTS

| CN | 105820286 A | 8/2016 |
| JP | H06-060461 U | 8/1994 |
| (Continued) | | |

OTHER PUBLICATIONS

Machine translation of JP2017-144392 (from IDS Aug. 28, 2023.*
(Continued)

*Primary Examiner* — Austin Murata
(74) *Attorney, Agent, or Firm* — Oliff PLC

(57) ABSTRACT

A film-forming atomizer atomizing a raw material liquid with ultrasonic wave to generate a raw material mist, includes: a raw material container containing the raw material liquid; a propagation vessel containing an intermediate liquid as a medium for propagating the ultrasonic wave to the raw material liquid; a support mechanism to support the raw material container so that at least a part of the raw material container is positioned in the intermediate liquid; a circulation mechanism to circulate the intermediate liquid; an ultrasonic wave generator to generate and apply the ultrasonic wave to the propagation vessel; and a degassing mechanism to discharge a gas in the intermediate liquid out of the film-forming atomizer.

8 Claims, 4 Drawing Sheets

(56) References Cited

U.S. PATENT DOCUMENTS

| | | | | |
|---|---|---|---|---|
| 2011/0147482 A1* | 6/2011 | Matsuura | ............... | B01D 1/14 239/102.1 |
| 2016/0215391 A1 | 7/2016 | Sasaki et al. | | |

FOREIGN PATENT DOCUMENTS

| JP | 2003-001159 A | 1/2003 |
|---|---|---|
| JP | 2005-111328 A | 4/2005 |
| JP | 2005-305233 A | 11/2005 |
| JP | 2007-181808 A | 7/2007 |
| JP | 2008-126190 A | 6/2008 |
| JP | 2011-110453 A | 6/2011 |
| JP | 2013-028480 A | 2/2013 |
| JP | 2014-069171 A | 4/2014 |
| JP | 2017-144392 A | 8/2017 |
| JP | 2018-076568 A | 5/2018 |
| JP | 2018-142637 A | 9/2018 |

OTHER PUBLICATIONS

Machine translation of JP 2005305233 from IDS.*
Sep. 28, 2021 Search Report issued in International Application No. PCT/JP2021/026035.
Feb. 7, 2023, International Preliminary Report on Patentability issued in in International Application No. PCT/JP2021/026035.
Feb. 29, 2024 Office Action issued in Chinese Patent Application No. 202180057959.7.
Jun. 25, 2023 Office Action and Search Report issued in Chinese Patent Application No. 202180057959.7.
Jul. 11, 2023 Office Action issued in Japanese Patent Application No. 2022-541177.
Jul. 30, 2024 Extended European Search Report issued in European Application No. 21854204.1.
Nov. 23, 2023 Office Action issued in Chinese Patent Application No. 202180057959.7.

* cited by examiner

[FIG. 1]
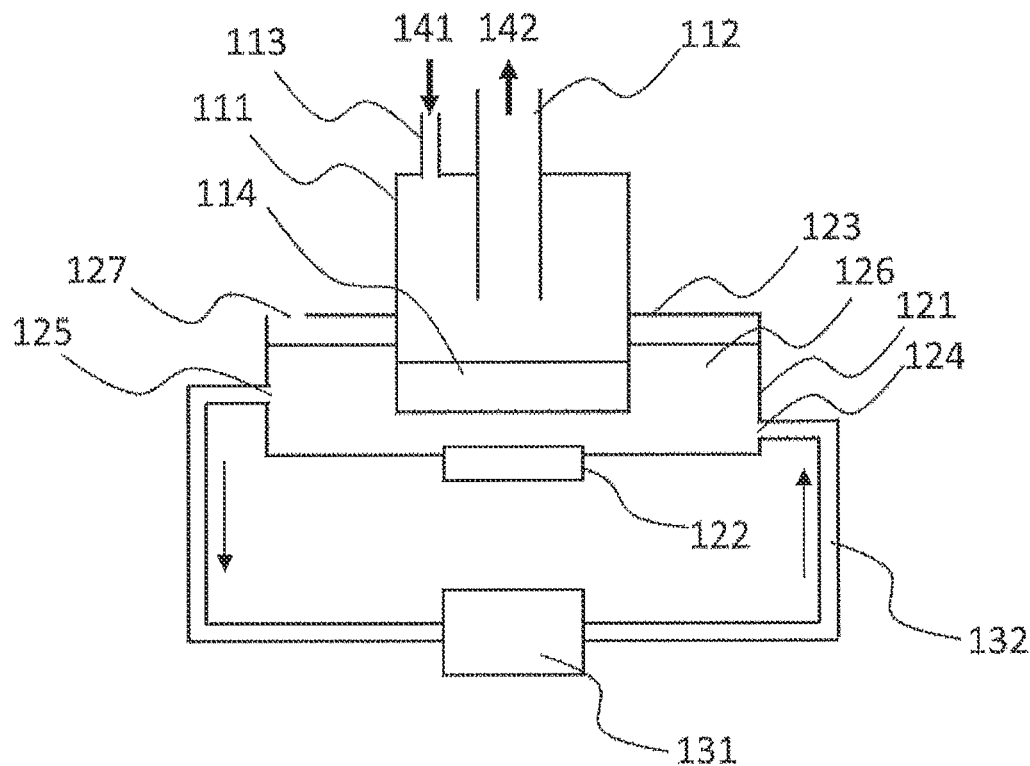

[FIG. 2]
200
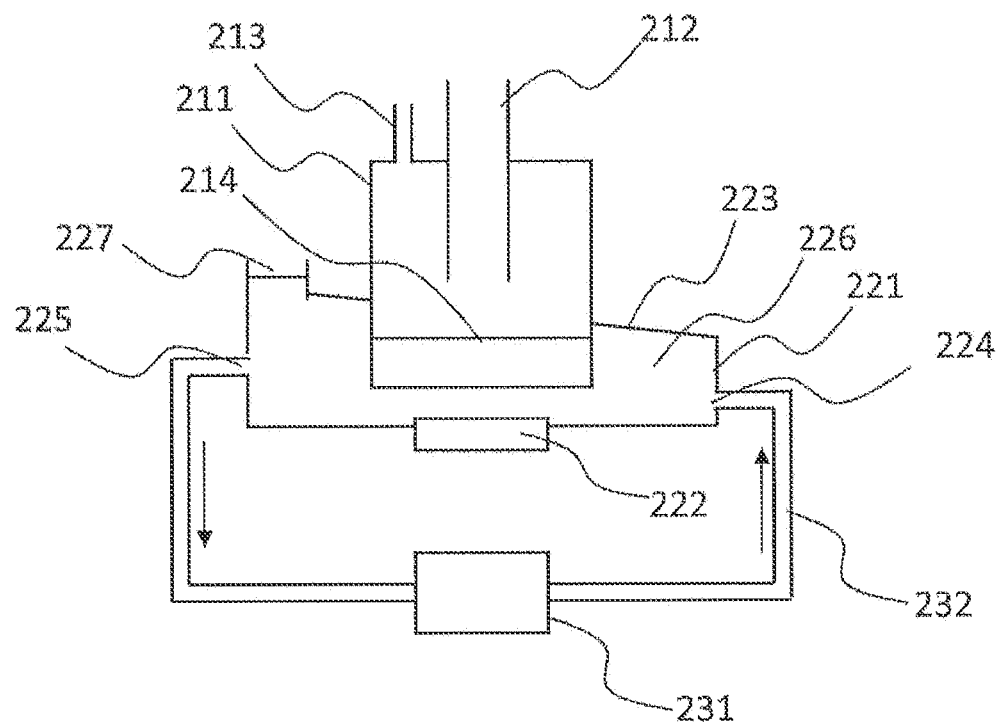

[FIG. 3]
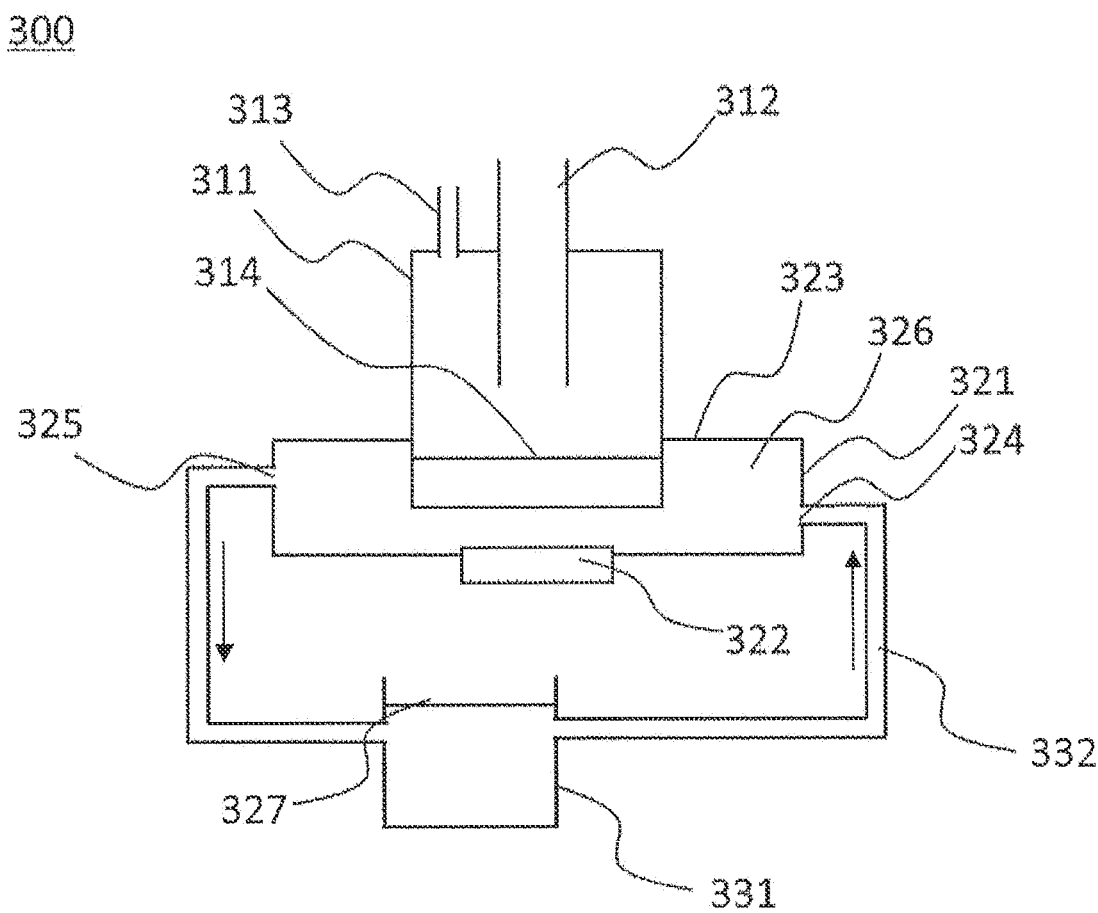
[FIG. 4]
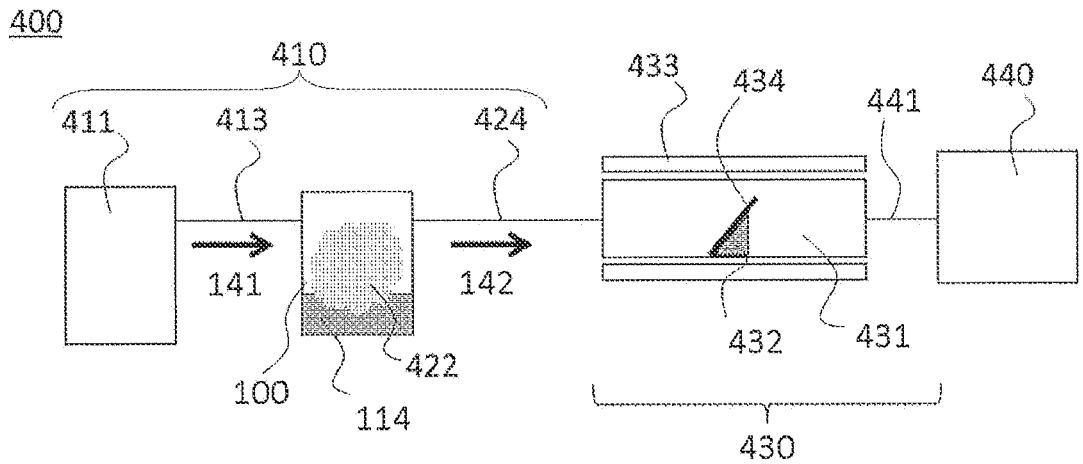

[FIG. 5]
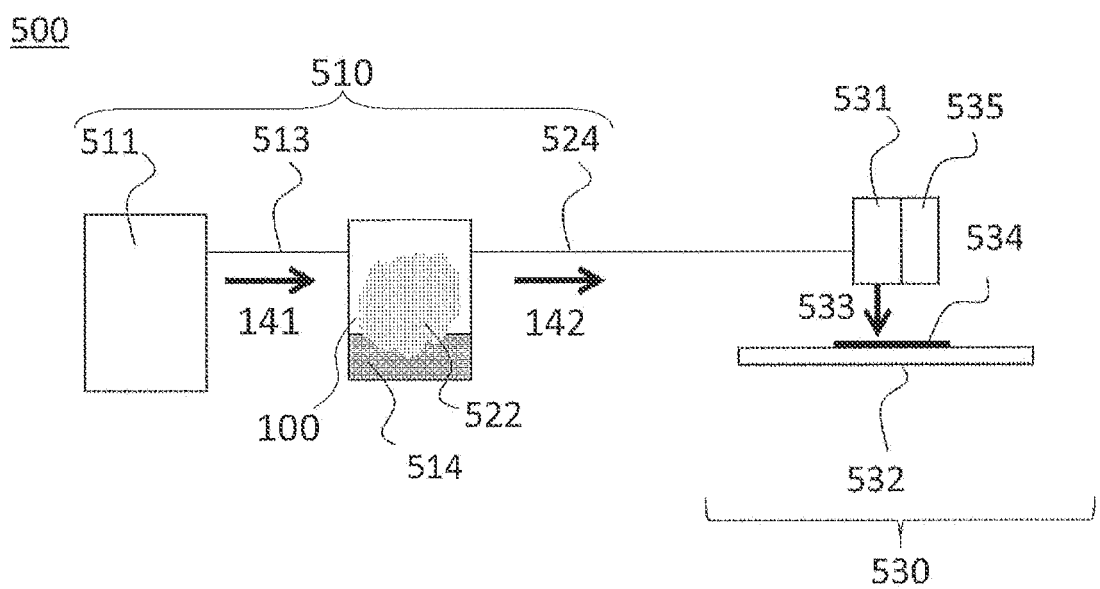

FILM-FORMING ATOMIZER, FILM-FORMING APPARATUS, AND FILM-FORMING METHOD

TECHNICAL FIELD

The present invention relates to a film-forming atomizer, a film-forming apparatus, and a film-forming method.

BACKGROUND ART

As a method that can form an epitaxial film, etc. at a low temperature and the atmospheric pressure, known is a film-forming technique using liquid fine particles, such as a mist CVD method. Patent Document 1 discloses a method in which a container containing a raw material solution is subjected to an ultrasonic wave vibrator to atomize the raw material solution into mist, and the obtained raw material mist is supplied with carrier gas onto a substrate in a reaction chamber in which film-forming is performed.

The ultrasonic wave is applied to the raw material liquid commonly through an intermediate liquid, such as water, for availability of varied materials including a corrosive raw material liquid. However, continuously applying the ultrasonic wave generates bubbles from the intermediate liquid to cause a problem of inhibiting the ultrasonic wave propagation to the raw material liquid to decrease the generation amount of the mist. Whereas, Patent Document 2 discloses a method in which an angle of a bottom face of the raw material container is provided relative to a liquid level of the intermediate liquid to avoid bubble adhesion onto the bottom face of the raw material container.

CITATION LIST

Patent Literature

Patent Document 1: JP 2013-28480 A
Patent Document 2: JP 2005-305233 A

SUMMARY OF INVENTION

Technical Problem

In the structure in Patent Document 2, however, the raw material liquid has ununiform depth in the raw material container, and thereby the raw material liquid cannot be sufficiently atomized when, in particular, a plurality of ultrasonic wave generators is employed. Moreover, there is a problem that the atomizer structure becomes complex and expensive.

The present invention has been made to solve the above-described problem. An object of the present invention is to provide: a film-forming atomizer that can continuously atomize the raw material liquid with high efficiency; a film-forming apparatus including such an atomizer; and a film-forming method that can stably form a film with high productivity.

Solution to Problem

To achieve the above object, the present invention provides a film-forming atomizer atomizing a raw material liquid with ultrasonic wave to generate a raw material mist, the atomizer comprising:
 a raw material container containing the raw material liquid;
 a propagation vessel containing an intermediate liquid as a medium for propagating the ultrasonic wave to the raw material liquid;
 a support mechanism to support the raw material container so that at least a part of the raw material container is positioned in the intermediate liquid;
 a circulation mechanism to circulate the intermediate liquid;
 an ultrasonic wave generator to generate and apply the ultrasonic wave to the propagation vessel; and
 a degassing mechanism to discharge a gas in the intermediate liquid out of the film-forming atomizer.

Such an atomizer can prevent retention of gas in the intermediate liquid on the bottom of the raw material container and others as bubbles, and can suppress prevention of the ultrasonic wave propagation to the raw material liquid due to the bubbles, and thereby the ultrasonic can be continuously propagated to the raw material liquid with high efficiency. As a result, the inventive atomizer can continuously atomize the raw material liquid with high efficiency. In addition, the inventive atomizer, which can continuously atomize the raw material liquid, can atomize a raw material liquid having a high density. The film-forming apparatus including such an atomizer can form a stable film with high productivity.

In the film-forming atomizer, an injection port for injecting the intermediate liquid from the circulation mechanism to the propagation vessel is preferably provided at a position lower than a bottom face of the raw material container.

Such an atomizer can efficiently remove gas in the intermediate liquid, and consequently the atomizer can continuously atomize the raw material liquid with higher efficiency.

In the film-forming atomizer, a draining port for draining the intermediate liquid from the propagation vessel to the circulation mechanism is preferably provided at a position higher than a bottom face of the raw material container.

Such an atomizer can efficiently remove gas in the intermediate liquid, and consequently the atomizer can continuously atomize the raw material liquid with higher efficiency.

The raw material container preferably comprises a horizontal bottom face.

Such an atomizer can uniformize the depth of the raw material liquid in the raw material container, and thereby the atomizer can more sufficiently atomize the raw material liquid. As a result, the atomizer can continuously the raw material liquid with higher efficiency. In addition, such a shape can simplify the apparatus structure to contribute to cost reduction.

The degassing mechanism may be provided on the propagation vessel.

In this case, for example, the degassing mechanism may spatially connect an internal part and an external part of a space surrounded by the propagation vessel and the support mechanism to support the raw material container.

Alternatively, the degassing mechanism may be provided on the circulation mechanism.

As above, the degassing mechanism may be provided at any position where the intermediate liquid can be present.

The present invention also provides a film-forming apparatus configured to supply a raw material mist to a film-forming device and to form a thin film on a base substrate provided on the film-forming device, the apparatus comprising:
 the inventive film-forming atomizer;
 the film-forming device; and
 a supplying mechanism configured to supply the raw material mist to the film-forming device by a carrier gas, the raw material mist being generated by atomization with the film-forming atomizer.

Such a film-forming apparatus, which includes the inventive film-forming atomizer, can stably and continuously form a film, and can be an apparatus with high productivity.

The present invention also provides a film-forming method for supplying a raw material mist to a film-forming device and forming a thin film on a base substrate provided on the film-forming device, the method comprising:

- a step of atomizing a raw material liquid with the inventive film-forming atomizer;
- a step of mixing the atomized raw material liquid and a carrier gas to form a mixed gas; and
- a step of supplying the mixed gas to the base substrate to perform film-forming.

Such a film-forming method, which involves the inventive film-forming atomizer, can stably and continuously perform film-forming on a large-size substrate, the film-forming on the large-size substrate requiring a longer time, and can perform a stable film-forming with high productivity.

Advantageous Effects of Invention

As described above, the inventive film-forming atomizer can continuously propagate the ultrasonic wave to the raw material liquid with high efficiency, and can be an atomizer that can stably atomize the raw material liquid. That is, the inventive film-forming atomizer can continuously atomize the raw material liquid with high efficiency.

The inventive film-forming apparatus can stably form a film with high productivity.

The inventive film-forming method can stably form a film with high productivity.

BRIEF DESCRIPTION OF DRAWINGS

FIG. 1 is a schematic view illustrating an embodiment of a film-forming atomizer according to the present invention.

FIG. 2 is a schematic view illustrating another embodiment of a film-forming atomizer according to the present invention.

FIG. 3 is a schematic view illustrating still another embodiment of a film-forming atomizer according to the present invention.

FIG. 4 is a schematic view illustrating an embodiment of a film-forming apparatus according to the present invention.

FIG. 5 is a schematic view illustrating another embodiment of a film-forming apparatus according to the present invention.

DESCRIPTION OF EMBODIMENTS

The present invention relates to: a film-forming atomizer used for forming a film, the atomizer atomizing a raw material liquid with ultrasonic wave from an ultrasonic wave generator, such as an ultrasonic wave vibrator; and a film-forming apparatus and a film-forming method each using this film-forming atomizer.

As described above, there have been demands for the developments of a film-forming atomizer that can continuously atomize a raw material liquid with high efficiency.

The present inventors have earnestly studied the above problem and consequently found that, in a film-forming atomizer atomizing a raw material liquid with ultrasonic wave to generate a raw material mist, the film-forming atomizer including a circulation mechanism to circulate an intermediate liquid in a propagation vessel and a degassing mechanism to discharge gas in the intermediate liquid out of the film-forming atomizer, this intermediate liquid can be transferred so that the gas in the intermediate liquid moves toward the degassing mechanism, and this configuration can efficiently discharge the gas in the intermediate liquid out of the film-forming atomizer. This finding has led to the completion of the present invention.

Specifically, the present invention is a film-forming atomizer atomizing a raw material liquid with ultrasonic wave to generate a raw material mist, the atomizer comprising:

- a raw material container containing the raw material liquid;
- a propagation vessel containing an intermediate liquid as a medium for propagating the ultrasonic wave to the raw material liquid;
- a support mechanism to support the raw material container so that at least a part of the raw material container is positioned in the intermediate liquid;
- a circulation mechanism to circulate the intermediate liquid;
- an ultrasonic wave generator to generate and apply the ultrasonic wave to the propagation vessel; and
- a degassing mechanism to discharge a gas in the intermediate liquid out of the film-forming atomizer.

In addition, the present invention is a film-forming apparatus configured to supply a raw material mist to a film-forming device and to form a thin film on a base substrate provided on the film-forming device, the apparatus comprising:

- the inventive film-forming atomizer;
- the film-forming device; and
- a supplying mechanism configured to supply the raw material mist to the film-forming device by a carrier gas, the raw material mist being generated by atomization with the film-forming atomizer.

In addition, the present invention is a film-forming method for supplying a raw material mist to a film-forming device and forming a thin film on a base substrate provided on the film-forming device, the method comprising:

- a step of atomizing a raw material liquid with the inventive film-forming atomizer;
- a step of mixing the atomized raw material liquid and a carrier gas to form a mixed gas; and
- a step of supplying the mixed gas to the base substrate to perform film-forming.

Hereinafter, the present invention will be described in detail with reference to the drawings, but the present invention is not limited thereto.

[Film-Forming Atomizer]

The inventive film-forming atomizer is a film-forming atomizer atomizing a raw material liquid with ultrasonic wave to generate a raw material mist, the atomizer including:

- a raw material container containing the raw material liquid;
- a propagation vessel containing an intermediate liquid as a medium for propagating the ultrasonic wave to the raw material liquid;
- a support mechanism to support the raw material container so that at least a part of the raw material container is positioned in the intermediate liquid;
- a circulation mechanism to circulate the intermediate liquid;
- an ultrasonic wave generator to generate and apply the ultrasonic wave to the propagation vessel; and a degassing mechanism to discharge a gas in the intermediate liquid out of the film-forming atomizer.

The film-forming atomizer including the propagation vessel containing the intermediate liquid as a medium for propagating ultrasonic wave to the raw material liquid, the atomizer atomizing (micronizing) the raw material liquid with the ultrasonic wave to generate a raw material mist (raw material fine particles), has the problem that, as described above, continuously applying the ultrasonic wave generates bubbles of gas contained in the intermediate liquid, and these bubbles retain between the intermediate liquid and the raw material container to inhibit the ultrasonic wave propagation to the raw material liquid.

The inventive film-forming atomizer includes: the circulation mechanism to circulate the intermediate liquid; and the degassing mechanism to discharge gas in the intermediate liquid out of the film-forming atomizer, and thereby, as described above, the inventive film-forming atomizer can transfer this intermediate liquid so that the gas in the intermediate liquid moves toward the degassing mechanism. According to this configuration, the inventive film-forming atomizer can efficiently discharge the gas in the intermediate liquid out of the film-forming atomizer. As a result, the inventive film-forming atomizer can continuously atomize the raw material liquid with high efficiency. In addition, the inventive atomizer, which can continuously atomize the raw material liquid, can atomize a raw material liquid having a high density.

In the film-forming atomizer, an injection port for injecting the intermediate liquid from the circulation mechanism to the propagation vessel is preferably provided at a position lower than a bottom face of the raw material container.

Furthermore, in the film-forming atomizer, a draining port for draining the intermediate liquid from the propagation vessel to the circulation mechanism is preferably provided at a position higher than a bottom face of the raw material container.

An atomizer according to any one of the preferred aspects can further enhance a transfer of the intermediate liquid in which gas in the intermediate liquid moves toward the degassing mechanism, and thereby the gas in the intermediate liquid can be removed more efficiently. As a result, the atomizer can continuously atomize the raw material liquid with higher efficiency.

The raw material container preferably includes a horizontal bottom face.

Such an atomizer can uniformize a depth of the raw material liquid in the raw material container, and thereby the atomizer can sufficiently atomize the raw material liquid. As a result, the atomizer can continuously atomize the raw material liquid with higher efficiency. In addition, such an atomizer can simplify the apparatus shape to contribute to reduction in an apparatus cost.

The degassing mechanism is to discharge the gas in the intermediate liquid out of the film-forming atomizer, and therefore may be provided at any position where the intermediate liquid can be present.

For example, the degassing mechanism may be provided on the propagation vessel, or may be provided on the circulation mechanism.

The inventive film-forming atomizer can include a component other than the raw material container, the propagation vessel, the support mechanism, the circulation mechanism, the ultrasonic wave generator, and the degassing mechanism. For specific examples thereof, see the following description.

Hereinafter, specific examples of the inventive film-forming atomizer will be described with reference to FIG. 1 to FIG. 3.

FIG. 1 schematically illustrates an embodiment of a film-forming atomizer 100 according to the present invention. The film-forming atomizer 100 includes: a raw material container 111 containing a raw material liquid 114; a propagation vessel 121 containing an intermediate liquid 126 as a medium for propagating the ultrasonic wave to the raw material liquid 114; a support mechanism 123 to support the raw material container 111 so that at least a part of this raw material container 111 is positioned in the intermediate liquid 126; a circulation mechanism 131 to circulate the intermediate liquid 126; an ultrasonic wave generator 122 to generate and apply the ultrasonic wave to the propagation vessel 121; and a degassing mechanism 127 to discharge a gas in the intermediate liquid 126 out of the film-forming atomizer 100.

The film-forming atomizer 100 further includes: a tubular member 112 spatially connecting an internal part and an external part of the raw material container 111, and provided so that a lower end thereof is not contacted with a liquid level of the raw material liquid 114 in the raw material container 111; and a pipe 132 fluid-connecting the propagation vessel 121 and the circulation mechanism 131.

The circulation mechanism 131 is configured to circulate the intermediate liquid 126 between the circulation mechanism 131 and the propagation vessel 121 through the pipe 132 in the arrow direction. The circulation mechanism 131 may further have a temperature controlling function for the intermediate liquid 126.

The raw material container 111 preferably includes a horizontal bottom face, as illustrated in FIG. 1. Such a configuration can uniformize the depth of the raw material liquid 114 in the raw material container 111 to enable to more sufficiently atomize the raw material liquid 114. As a result, the raw material liquid 114 can be continuously atomized with higher efficiency.

On the raw material container 111, a carrier gas inlet port 113 for introducing a carrier gas 141 is provided. Although shapes of the raw material container 111 and the tubular member 112 are not particularly limited, those having cylindrical shapes can smoothly transfer a mixed gas 142 which is formed by mixing the carrier gas 141 and a raw material mist (not illustrated) atomized by means of the ultrasonic wave with each other. The carrier gas inlet port 113 is preferably provided above the lower end of the tubular member 112 inside the raw material container 111. By such a configuration, the carrier gas 141 and the raw material mist can be sufficiently mixed with each other.

Although not illustrated, the atomizer 100 may further includes a mechanism to refill the raw material liquid 114 depending on its consumption.

The propagation vessel 121 is a member to contain the intermediate 126 for propagating the ultrasonic wave irradiated from the ultrasonic wave generator 122 to the raw material liquid 114.

The ultrasonic wave-irradiation surface of the ultrasonic wave generator 122 is flat. The irradiation direction may be fixed by inclining this irradiation surface, or may be inclined by appropriately regulating the angle. A plurality of the ultrasonic wave generators 112 may be provided depending on a desired mist density, size of the raw material container 111, etc. A frequency of the ultrasonic wave oscillated from the ultrasonic wave generator 122 is not particularly limited as long as the generated mist has desired particle diameter and particle size, and favorably used frequency is 1.5 MHz to 4.0 MHz, for example. This configuration atomizes the raw material liquid 114 into a mist (performs atomization) of micron-sized droplets (raw material mist), suitable for film formation.

The raw material liquid 114 is not particularly limited as long as it is atomized by the ultrasonic wave, and can be appropriately selected depending on a thin film to be formed.

The intermediate liquid 126 is not particularly limited as long as it does not inhibit the ultrasonic wave propagation. Water, alcohols, and oils may be used as the intermediate liquid 126, but in particular, water is preferably used in the present invention. Although not illustrated, the propagation vessel 121 may further include a means for detecting and controlling a liquid level and temperature of the intermediate liquid 126.

As illustrated in FIG. 1, the raw material container 111 is held by the support mechanism 123 in a state where a bottom thereof keeps a certain distance from a bottom of the propagation vessel 121. The propagation vessel 121 has: an injection port 124 for receiving the intermediate liquid 126 from the circulation mechanism 131 via the pipe 132; and a draining port 125 for draining the intermediate liquid 126 to the circulation mechanism 131 via the pipe 132. The raw material container 111 is supported by the support mechanism 123 to be provided so that the intermediate liquid 126 flows from the injection port 124 through under the raw material container to the draining port 125. In this time, the injection port 124 is preferably provided at a position lower than the bottom of the raw material container 111. This configuration more easily removes bubbles (gas in the intermediate liquid 126) generated between the ultrasonic wave generator 122 and the bottom of the raw material container 111, and thereby the ultrasonic wave propagation is not inhibited to enable to stably atomize the raw material. A holding height of the raw material container 111, which depends on the frequency of the used ultrasonic wave, is typically favorably set so that a gap between the liquid level of the raw material liquid 114 and the ultrasonic wave irradiation surface of the ultrasonic wave generator 122 is appropriately 10 mm to 70 mm.

The degassing mechanism 127 is provided above the draining port 125 of the propagation vessel 121. The degassing mechanism 127 spatially connects an internal part and an external part of a space surrounded by the propagation vessel 121 and the support mechanism 123 to support the raw material container 111. The bubbles moved with the flow of the intermediate liquid 126 rises in the intermediate liquid 126 to be discharged through the degassing mechanism 127 out of the film-forming atomizer 100. Since the bubbles are released through the degassing mechanism 127 out of the film-forming atomizer 100 as above, avoided is inhibition of the ultrasonic wave propagation due to bubbles floats in a long time in the intermediate liquid 126. A flow rate of the intermediate liquid 126 in this time is not particularly limited as long as it is a rate to transfer the bubble generated in the intermediate liquid 126, and typically favorably 1 L/min or more to 20 L/min.

In FIG. 1, the degassing mechanism 127 is constituted with a space above the draining port 125 of the propagation vessel 121, the space sandwiched by the support mechanism 123 and the intermediate liquid 126, and continued to the outside of the film-forming atomizer 100. However, an aspect of the degassing mechanism is not limited thereto.

For example, as illustrated in FIG. 2, a support mechanism 223 may be inclined, and a degassing mechanism 227 may be provided on a part of a side of a draining port 225 at the upper part of a propagation vessel 221. By such a configuration, the gas (bubbles) in the intermediate liquid 226 filled under the support mechanism 223 can be easily released out of the film-forming atomizer 200 through the degassing mechanism 227.

Alternatively, as illustrated in FIG. 3, an intermediate liquid 326 may be sealed with a propagation vessel 321 and a support mechanism 326, and in addition, gas (bubbles) in the intermediate liquid 326 may be discharged out of a film-forming atomizer 300 through a degassing mechanism 327 provided on a circulation mechanism 331. In this case, in order to efficiently discharge the bubbles from the propagation vessel 321, a draining port 325 is preferably provided at least above a bottom face of a raw material container 311, more preferably provided near the upper end of the propagation vessel 321. Also, in the film-forming atomizers 100 and 200 illustrated in FIG. 1 and FIG. 2, the draining ports 125 and 225 are provided at a position higher than the bottom face of the raw material containers 111 and 211, respectively.

In FIG. 2 and FIG. 3, each of the reference signs 211 and 311 is referred to a raw material container similar to the raw material container 111 illustrated in FIG. 1, each of the reference signs 212 and 312 is referred to a tubular member similar to the tubular member 112 illustrated in FIG. 1, each of the reference signs 213 and 313 is referred to a carrier gas inlet port similar to the carrier gas inlet port 113 illustrated in FIG. 1, each of the reference signs 214 and 314 is referred to a raw material liquid similar to the raw material liquid 114 illustrated in FIG. 1, each of the reference signs 222 and 322 is referred to an ultrasonic wave generator similar to the ultrasonic wave generator 122 illustrated in FIG. 1, each of the reference signs 224 and 324 is referred to an injection port similar to the injection port 124 illustrated in FIG. 1, each of the reference signs 231 and 331 is referred to a circulation mechanism similar to the circulation mechanism 131 illustrated in FIG. 1, and each of the reference signs 232 and 332 is referred to a pipe similar to the pipe 132 illustrated in FIG. 1.

A method for supporting the raw material container preferably does not inhibit the flow of the intermediate liquid in the bottom of the raw material container. For example, the support mechanism may have a structure of a plurality of pillars stood in the propagation vessel to mount the raw material container thereon.

Members constituting the film-forming atomizer are not particularly limited as long as they are material and structure having: chemical stability against the raw material liquid and the intermediate liquid; and sufficient mechanical strength. For example, a metal, a plastic material, glass, a material in which a metal surface is coated with a plastic material, etc. can be used.

[Film-Forming Apparatus]

The inventive film-forming apparatus is configured to supply a raw material mist to a film-forming device and to form a thin film on a base substrate provided on the film-forming device, the apparatus comprising:

the inventive film-forming atomizer;

the film-forming device; and a supplying mechanism configured to supply the raw material mist to the film-forming device by a carrier gas, the raw material mist being generated by atomization with the film-forming atomizer.

The inventive film-forming apparatus, which includes the inventive film-forming atomizer, can stably and continuously form a film, and can be an apparatus with high productivity.

Hereinafter, specific examples of the inventive film-forming apparatus will be described with reference to FIG. 4 and FIG. 5.

FIG. 4 schematically illustrates an embodiment of the film-forming apparatus according to the present invention.

A film-forming apparatus 400 illustrated in FIG. 4 includes: a film-forming atomizer 100; a supplying mechanism 410; and a film-forming device 430.

The film-forming atomizer 100 is the atomizer 100 of the example of the inventive film-forming atomizer described with reference to FIG. 1. Illustration of the circulation mechanism 131, etc. of the atomizer 100 is omitted. The film-forming atomizer 100 may be the film-forming atomizers 200 and 300 described with reference to FIG. 2 and FIG. 3.

As described above, the film-forming atomizer 100 is configured to atomize the raw material liquid 114 with the ultrasonic wave to generate the raw material mist 422.

The supplying mechanism 410 includes a carrier gas supplier 411 and pipes 413 and 424. The carrier gas supplier 411 is connected to the film-forming atomizer 100 via the pipe 413. The carrier gas supplier 411 is configured to supply the carrier gas 141 to the film-forming atomizer 100 via the pipe 413. The film-forming atomizer 100 is connected to the film-forming device 430 via the pipe 424. The mixed gas 142 of the carrier gas 141 and the raw material mist 422 is supplied to the film-forming device 430 via the pipe 424. That is, the supplying mechanism 410 is configured to supply the raw material mist 422 generated by atomization with the film-forming atomizer 100 to the film-forming device 430 with the carrier gas 141.

The carrier gas supplier 411 may be an air compressor, gas cylinders, or a nitrogen gas separator, and may include a mechanism to regulate a supplying rate of the gas. The pipes 413 and 424 are not particularly limited as long as they have sufficient stability against the raw material liquid 114 and a temperature near the film-forming device 430. For the pipes 413 and 424, a quartz pipe and a pipe made of a common resin, such as polyethylene, polypropylene, vinyl chloride, a silicone resin, a urethane resin, and a fluororesin can be widely used. Although not illustrated, another pipe may be connected from the carrier gas supplier 411 to the pipe 424 without involving the film-forming atomizer 100 to enable to supply a dilution gas to the mixed gas 142.

A plurality of the film-forming atomizers 100 may be composed depending on a material to be formed into a film, etc. In this case, the mixed gases 142 supplied from the plurality of the atomizers 100 to the film-forming device 430 may be each independently supplied to the film-forming device 430, may be mixed in the pipe 424, or may be mixed in a separately provided container for mixing (not illustrated).

The film-forming device 430 may include: a film-forming chamber 431; a susceptor 432 provided in this film-forming chamber 431 to hold a base substrate 434 on which a film is formed; and a heating means 433 to heat the base substrate 434.

A structure, etc. of the film-forming chamber 431 are not particularly limited. For example, metals such as aluminum and stainless steel may be used, or quartz or silicon carbide may be used when a film is formed at higher temperature.

The heating means 433 may be selected depending on a material and structure of the base substrate 434, the susceptor 432, and the film-forming chamber 431, and a resistance heater and a lamp heater are preferably used.

As described above, the carrier gas 141 is mixed with the raw material mist 422 formed in the film-forming atomizer 100 to be the mixed gas 142, transferred into the film-forming chamber 431 of the film-forming device 430, and a film is formed on the base substrate 434.

The base substrate 434 is not particularly limited as long as it can support a film to be formed. A material of the base substrate 434 is also not particularly limited, and may be a known material, may be an organic compound, or may be an inorganic compound. Examples thereof include a polysulfone, a polyether sulfone, a polyphenylene sulfide, a polyether ether ketone, a polyimide, a polyether imide, a fluororesin, metals such as iron, aluminum, stainless steel, and gold, silicon, sapphire, quartz, glass, calcium carbonate, lithium tantalate, lithium niobate, gallium oxide, SiC, ZnO, and GaN, and the material is not limited thereto. Examples of a shape of the base substrate 434 include a flat plate and a disk plate, and any one of them may be used. Although not particularly limited, a base substrate 434 having an area of 5 cm$^2$ or more, more preferably 10 cm$^2$ or more, and a thickness of 50 to 2000 μm, more preferably 100 to 800 μm is preferably used in the present invention. As a modified example, a fibrous, bar, cylindrical, prism, tubular, spiral, spherical, or ring substrate may also be used instead of the base substrate 434.

The inventive film-forming apparatus may further include a ventilation means 440 illustrated in FIG. 4. The ventilation means 440 may be connected to the film-forming device 430 with the pipe 441, or may be provided at a distance. A structure and constitution of the ventilation means 440 are not particularly limited as long as the ventilation means 440 is constituted with a material stable against heat and gas and product discharged from the film-forming device 430, and a commonly known ventilation fan or ventilation pump can be used. Depending on properties of the discharged gas and product, a mist trap, a wet scrubber, a bug filter, a detoxifier, etc. may be provided.

Although described in FIG. 4 is the embodiment of the film-forming device 430 in which the base substrate 434 is provided inside the film-forming chamber 431, the inventive film-forming apparatus is not limited thereto. As illustrated in FIG. 5, a film-forming device 530 may have a constitution in which a nozzle 531 is used to discharge a mixed gas 533 for directly spraying the mixed gas 533 to a base substrate 534 provided on a susceptor 532 and forming a film. In this case, a driving means to drive either or both of the nozzle 531 and the susceptor 532 in the horizontal direction may be included so as to form a film with changing a relative position between the base substrate 534 and the nozzle 531 in the horizontal direction. The susceptor 532 may include a heating means to heat the base substrate 534.

The nozzle 531 is not particularly limited as long as it is configured to receive the mixed gas 142 from the film-forming atomizer 100 and to discharge it as the mixed gas 533.

The film-forming device 530 may include a ventilation means 535. The ventilation means 535 may be integrated with the nozzle 531 as illustrated in FIG. 5, or may be separately provided.

It should be noted that in FIG. 5, the reference sign 511 is referred to a carrier gas supplier similar to the carrier gas supplier 411 illustrated in FIG. 4, the reference sign 510 is referred to a supplying mechanism similar to the supplying mechanism 410 illustrated in FIG. 4, the reference sign 514 is referred to a raw material liquid similar to the raw material liquids 114, 214, and 314 illustrated in FIG. 1 to FIG. 4, the reference sign 522 is referred to a raw material mist similar to the raw material mist 422 illustrated in FIG. 4, each of the reference signs 513 and 524 is referred to pipes similar to each of the pipes 413 and 424 illustrated in FIG. 4, and the reference sign 141 is referred to a carrier gas similar to the carrier gas 141 illustrated in FIG. 1 and FIG. 4.

[Film-Forming Method]

The inventive film-forming method is a film-forming method for supplying a raw material mist to a film-forming device and forming a thin film on a base substrate provided on the film-forming device, the method including:

a step of atomizing a raw material liquid with the inventive film-forming atomizer;

a step of mixing the atomized raw material liquid and a carrier gas to form a mixed gas; and a step of supplying the mixed gas to the base substrate and performing film-forming.

Such a film-forming method, which involves the inventive film-forming atomizer, can stably and continuously form a film on a large-size substrate requiring a longer time, and can stably form a film with high productivity.

In the inventive film-forming method, any of the film-forming atomizers 100, 200, and 300 illustrated in FIG. 1 to FIG. 3 can be used, for example. In the inventive film-forming method, any of the film-forming apparatuses 400 and 500 illustrated in FIG. 4 and FIG. 5 can be used, for example.

Hereinafter, an example of the inventive film-forming method will be described with reference to FIG. 4 again.

In this example, the raw material mist 422 is supplied to the film-forming device 430 and a thin film is formed on the base substrate 434 provided in the film-forming device 430.

First, the raw material liquid 114 is atomized by the film-forming atomizer 100 to generate the raw material mist 422.

Then, in the film-forming atomizer 100, the atomized raw material liquid (raw material mist 422) and the carrier gas 141 are mixed to form the mixed gas 142. The carrier gas 141 is supplied from the carrier gas supplier 414 to the film-forming atomizer 100 through the pipe 413.

Thereafter, the mixed gas 142 is supplied from the film-forming atomizer 100 to the film-forming device 430 through the pipe 424. Thereby, the mixed gas 142 is supplied onto the base substrate 434 provided in the film-forming device 430 and film-forming is performed.

For other details about the film-forming method using the film-forming apparatus 400 illustrated in FIG. 4, see the above description about the film-forming apparatus of FIG. 4.

EXAMPLES

Hereinafter, the present invention will be specifically described by using Examples and Comparative Examples, but the present invention is not limited thereto.

Example 1

In Example 1, according to the following procedure, a raw material liquid 114 was atomized by using the film-forming atomizer 100 illustrated in FIG. 1 and an atomization amount is measured.

First, weighed pure water was filled into a raw material container 111 as the raw material liquid 114. A gas cylinder filled with nitrogen gas and a carrier gas inlet port 113 were connected to each other with a tube made of a urethane resin. A mist trap was further provided, and the mist trap and a tubular member 112 were connected to each other with a pipe made of PFA.

Water was filled in a propagation vessel 121 as an intermediate liquid 126.

In the film-forming atomizer 100 thus provided, the pure water 114 in the raw material container 111 was atomized (formed into mist) by propagating ultrasonic wave vibration through the water 126 with two ultrasonic wave vibrators (frequency: 2.4 MHz) as an ultrasonic wave generators 122. In the same time, the water 126 in the propagation vessel 121 was circulated with a circulator as a circulation mechanism 131 with maintaining the temperature at 25° C.

Then, nitrogen gas as a carrier gas 141 was added into the raw material container 111 at a flow rate of 5 L/min for transferring a mixed gas 142 was transferred to the mist trap and the raw material mist was recovered.

The mixed gas 142 was discharged for 5 hours with continuously refilling water so as to maintain the water level of the water 114 in the raw material container 111, and then the atomization was finished.

Thereafter, the water recovered by the mist trap was weighed.

Comparative Example 1

In Comparative Example 1, an atomizer without the circulation mechanism 131 was used. That is, the atomization was performed in the same manner as in Example 1 except that: the water 126 in the propagation vessel 121 was not circulated; and the temperature of the water in the propagation vessel 121 was maintained at 25° C. with an immersion chiller.

Thereafter, the water recovered by the mist trap was weighed.

Table 1 shows the amounts of the recovered water obtained in Example 1 and Comparative Example 1.

TABLE 1

|  | Amount of recovered water [g] |
| --- | --- |
| Example 1 | 471 |
| Comparative Example 1 | 425 |

It is found from Table 1 that the film-forming atomizer 100 of Example 1, an example of the inventive film-forming atomizer, can generate a larger amount of mist than the atomizer of Comparative Example 1, which includes no circulation mechanism.

Example 2

In Example 2, an α-gallium oxide film was formed by using the film-forming apparatus 400 illustrated in FIG. 4, which includes the film-forming atomizer 100 illustrated in FIG. 1, according to the following procedure.

More specifically, used as the film-forming atomizer 100 was an apparatus including the raw material container 111 and the tubular member 112, both of them was made of borosilicate glass. A film-forming device 430 including a film-forming chamber 431 made of quartz was also provided. For a carrier gas supplier 411, a gas cylinder filled with nitrogen gas was used. The gas cylinder 411 and the film-forming atomizer 100 were connected to each other with a tube 413 made of a urethane resin, and the film-forming atomizer 100 and the film-forming device 430 were connected to each other with a pipe 424 made of quartz.

With the film-forming apparatus 400 thus provided, prepared as the raw material liquid 114 was a solution in which hydrochloric acid at concentration of 34% was added at a volume ratio of 1% to a 0.02 mol/L aqueous solution of gallium acetylacetonate to be stirred with a stirrer for 60 minutes. This raw material liquid 114 was filled in the raw material container 111.

Water as the intermediate liquid 126 was filled in the propagation vessel 121.

Then, as the base substrate 434, a c-face sapphire substrate with 0.6 mm in thickness and 4 inch in diameter was mounted on a susceptor 432 made of quartz provided in the film-forming chamber 431. The sapphire substrate was heated by using the heating means 433 so that a substrate temperature was to be 500° C.

Then, the raw material liquid 114 in the raw material container 111 was atomized (formed into mist) by propagating ultrasonic wave vibration through the water 126 with two ultrasonic wave vibrators (frequency: 2.4 MHz) as the ultrasonic wave generators 122, and a raw material mist 422 was generated. In the same time, the water 126 in the propagation vessel 121 was circulated with a circulator as the circulation mechanism 131 with maintaining the temperature at 25° C.

Then, nitrogen gas was added from the gas cylinder 411 into the raw material container 111 at a flow rate of 5 L/min for supplying the mixed gas 142 of the raw material mist 422 and the nitrogen gas 141 to the film-forming chamber 431 for 120 minutes and film-forming was performed. Immediately thereafter, the supply of the nitrogen gas was stopped to stop the supply of the mixed gas 142 to the film-forming chamber 431, and the base substrate 434 was taken out.

Thereafter, the above film formation was repeated four times using new substrates.

During the above five-time film formation, the raw material liquid 114 was continuously atomized without stop with refilling the raw material liquid 114.

The formed film, which was measured by X-ray diffraction to appear a peak at 2θ=40.3°, was confirmed to be α-phase $Ga_2O_3$.

Thereafter, of all the five formed sample films, thicknesses at nine positions in the substrate surface were measured by light reflectance analysis.

Comparative Example 2

In Comparative Example 2, an atomizer without the circulation mechanism 131 was used. That is, the film formation was performed in the same manner as in Example 2 except that: the water 126 in the propagation vessel 121 was not circulated; and the temperature of the water in the liquid vessel was maintained at 25° C. with an immersion chiller.

The formed film, which was measured by X-ray diffraction to appear a peak at 2θ=40.3°, was confirmed to be α-phase $Ga_2O_3$.

Thereafter, of all the five formed sample films, thicknesses at nine positions in the substrate surface were measured by light reflectance analysis.

The following Table 2 shows the thicknesses of the obtained films in Example 2 and Comparative Example 2. The thickness shown in Table 2 is an average value of the thicknesses at the nine positions.

TABLE 2

| Number of times of film formation | Thickness of film obtained in Example 2 [μm] | Thickness of film obtained in Comparative Example 2 [μm] |
|---|---|---|
| 1st | 2.12 | 2.13 |
| 2nd | 2.15 | 2.10 |
| 3rd | 2.15 | 2.09 |
| 4th | 2.13 | 1.95 |
| 5th | 2.16 | 1.90 |

As shown in Table 2, the film formation performed with the film-forming apparatus of Example 2, an example of the inventive film-forming apparatus, has a constant growth rate, and it is found that stable film formation was continuously achieved with good efficiency.

Meanwhile, as apparent from in Table 2, Comparative Example 2, which used the conventional atomizer without the circulation mechanism, decreased the growth rate with repeating film formations. It is presumed that, in Comparative Example 2, gas in the water 126 is generated and retained as bubbles on the bottom of the raw material container 111 during the atomization, and these bubbles inhibit the ultrasonic wave propagation to the raw material liquid 114.

It should be noted that the present invention is not limited to the above-described embodiments. The embodiments are just examples, and any examples that substantially have the same feature and demonstrate the same functions and effects as those in the technical concept disclosed in claims of the present invention are included in the technical scope of the present invention.

The invention claimed is:

1. A film-forming atomizer configured to atomize a raw material liquid with ultrasonic wave to generate a raw material mist, the atomizer comprising:
    a raw material container containing the raw material liquid;
    a propagation vessel containing an intermediate liquid as a medium for propagating the ultrasonic wave to the raw material liquid;
    a support mechanism configured to support the raw material container so that at least a part of the raw material container is in the intermediate liquid;
    a fluid circuit configured to circulate the intermediate liquid;
    an ultrasonic wave generator configured to generate and apply the ultrasonic wave to the propagation vessel; and
    a degassing mechanism configured to discharge a gas in the intermediate liquid out of the film-forming atomizer; wherein
    a draining port for draining the intermediate liquid from the propagation vessel to the fluid circuit is at a position higher than a bottom face of the raw material container; and
    an injection port for injecting the intermediate liquid from the fluid circuit to the propagation vessel is at a position lower than a bottom face of the raw material container.

2. The film-forming atomizer according to claim 1, wherein a draining port for draining the intermediate liquid from the propagation vessel to the fluid circuit is at a position higher than a bottom face of the raw material container.

3. The film-forming atomizer according to claim 1, wherein the raw material container comprises a horizontal bottom face.

4. The film-forming atomizer according to claim 1, wherein the degassing mechanism is on the propagation vessel.

5. The film-forming atomizer according to claim 4, wherein the degassing mechanism spatially connects an internal part and an external part of a space surrounded by the propagation vessel and the support mechanism to support the raw material container.

6. The film-forming atomizer according to claim 1, wherein the degassing mechanism is on the fluid circuit.

7. A film-forming apparatus configured to supply a raw material mist to a film-forming device and to form a thin film on a base substrate on the film-forming device, the apparatus comprising:

the film-forming atomizer according to claim 1;

the film-forming device; and a supplying mechanism configured to supply the raw material mist to the film-forming device by a carrier gas, the raw material mist being generated by atomization with the film-forming atomizer.

8. A film-forming method for supplying a raw material mist to a film-forming device and forming a thin film on a base substrate on the film-forming device, the method comprising:

atomizing a raw material liquid with the film-forming atomizer according to claim 1;

mixing the atomized raw material liquid and a carrier gas to form a mixed gas; and supplying the mixed gas to the base substrate to performing film-forming.

* * * * *